July 9, 1946.    A. G. GERDES    2,403,654
WELDER'S ARMREST
Filed Aug. 16, 1943
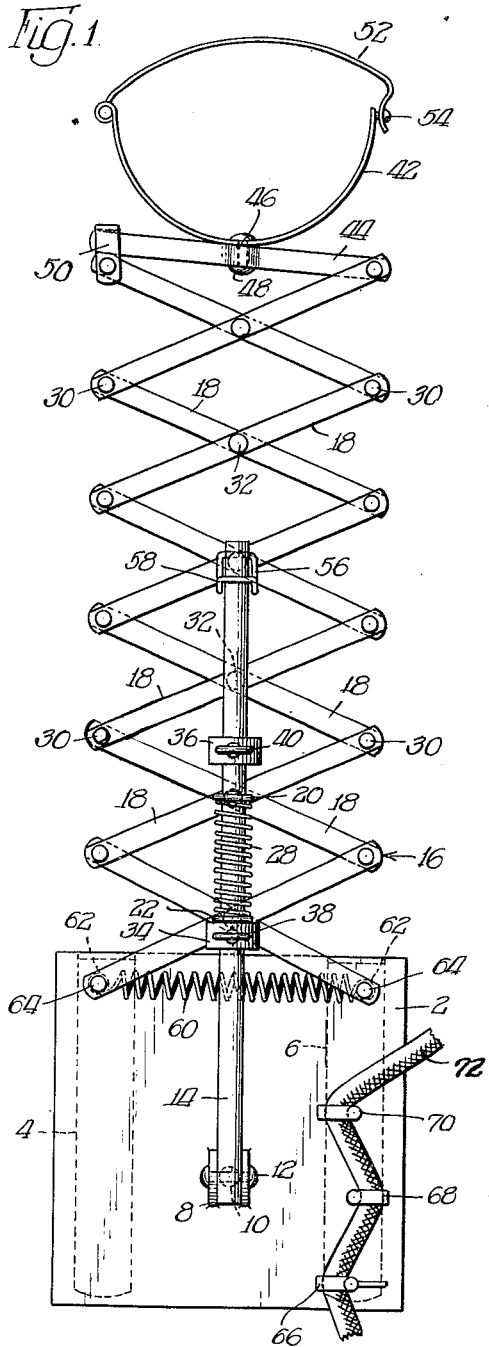
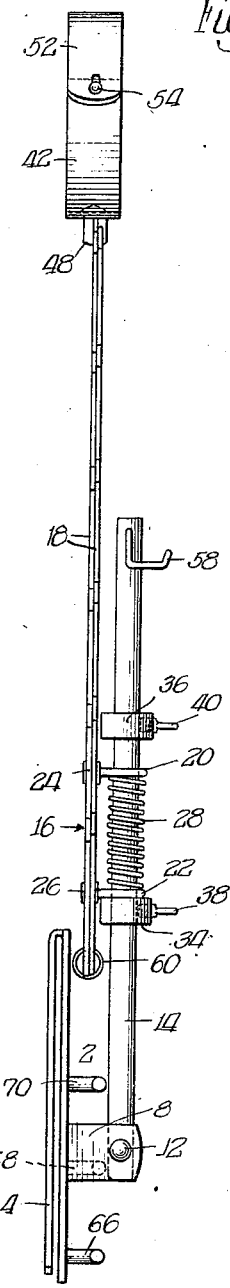
INVENTOR.
August G. Gerdes,
BY Spencer, Marzall,
Johnston & Cook
Attys Patented July 9, 1946

2,403,654

UNITED STATES PATENT OFFICE 2,403,654

WELDER'S ARMREST

August G. Gerdes, Clinton, Iowa

Application August 16, 1943, Serial No. 498,803

5 Claims. (Cl. 248—118)

This invention relates to a new and improved device or apparatus for supporting the arm of a welder during welding operations.

One of the objects of the invention is to provide a new and improved type of welder's armrest which is relatively compact and at the same time offers a maximum amount of support.

Another object of the invention is to provide a welder's armrest which can be fastened around the waist or to a belt and is out of the way when not in use.

Still a further object of the invention is to provide an armrest of the type described which is flexible and adjustable to different positions, including positions wherein the arm is supported from beneath, as well as those in which it is supported from above.

Other objects and advantages of the invention will be apparent by reference to the following description in conjunction with the accompanying drawing, in which Figure 1 represents an elevational view of one form of apparatus for practising the invention; and Figure 2 represents a side view of the device shown in Figure 1.

As illustrated in Figures 1 and 2, the device shown comprises a plate-like member or support 2 having on the inside thereof a pair of hooks or fasteners 4 and 6 which are adapted to fit over a belt, or the like, in order to hold the plate 2 against the body approximately at the waistline.

In the lower part of plate 2 is a yoke member or support 8 rotatably mounted on a stud or pin 10. The yoke member 8 is provided with holes at the outer end carrying a shaft or pivot member 12 on which is freely mounted a longitudinally extending supporting member 14. As will be seen, the member 14 is free to pivot or rotate around the shaft 12 from a position substantially parallel to the supporting plate 2 through a position substantially normal to said plate to a downward position approximately 180° from the position shown in the drawing. The normal working position of the member 14 is upward, as shown in Figures 1 and 2, but when the armrest is not in use and is disconnected from the arm of the user the member 14, together with the elements attached thereto, may be allowed to hang by the side of the user. The member 14 is also rotatable about pin 10 and, hence, is free to move from left to right, as well as up and down.

A lazy tongs 16, comprising a plurality of flat metal strips 18, is fastened to a pair of rings 20 and 22 at the juncture points 24 and 26, the rings 20 and 22 being slidably mounted on the longitudinally extending supporting member 14. A spring 28 is also slidably mounted on the member 14 between the rings 20 and 22.

The lazy tongs 16 are constructed in a well-known manner with the crossed members 18 freely connected at their outer edges by pins 30 and at their points of intersection by pins 32. Thus, when the spring 28 is compressed and then released it will tend to press against the rings 20 and 22 which are fixed to the lazy tongs 16 at points 24 and 26 and cause the lazy tongs to move outwardly while the pins 30 of the lazy tongs tend to move toward each other.

The movement of the spring 28, and hence the movement of the lazy tongs 16, is controlled by a pair of collars 34 and 36 provided with set screws 38 and 40, respectively. These collars 34 and 36 are slidable along the supporting member 14 and, hence, can be moved to a predetermined position to suit the needs of a particular person, thereby making it possible to compensate for differences in the height of the user or permitting the device to be extended where the welding operation is to be carried out above the head of the user.

As will be apparent, the relatively small expansion of the spring 28 will produce a much greater expansion of the lazy tongs 16. For example, in the device shown, with a spring capable of compression such that the distance between the points 20 and 22 is 2 inches when fully compressed and 3 inches when fully expanded, the lazy tongs can be increased in length from 10 inches when the spring is fully compressed to 19 inches when expanded; thus, an expansion of 1 inch in the spring 28 produces an expansion of 9 inches in the lazy tong 16.

At the upper end of the lazy tongs 16 is an armrest 42 adapted to support the upper arm of the welder. The armrest 42 is fastened to the upper part 44 of the lazy tongs 16 by means of a rivet or stud 46 passing through the element 48, which in turn is fixed to the element 44 by welding or in any other suitable manner. The rivet or stud 46 loosely engages the armrest 42, permitting the latter to swerve or rotate in order to accommodate the arm of the welder in different positions. The member 44 slidably engages a guide member 50 and can be disengaged therefrom merely by lifting upwardly. Thus, the armrest 42 can be inverted and, with the sides thereof against the lazy tongs 16, can be used to hold the arm of the welder from above with the assistance of the strap 52 which is fastened to one end of the armrest 42 by means of a pin 54, or other suitable fastening means.

When the device is not in use, the lazy tongs 16 are preferably compressed and held in place by means of the catch 56 which is pivotally mounted in the end of the longitudinal arm 14 and can be moved upwardly from the position shown in Figure 2, so that the hook portion 58 will hook the lazy tongs 16 above the intersections 32 or, if desired, above the armrest 42 at the point where it is fastened to pin 46. When thus held against the compression of the spring 28, the hook 58 will retain the lazy tongs 16 in a retracted or compressed state. A spring 60 is preferably connected across the lower ends of the lazy tongs 16, as shown in Figure 1, and is provided as an auxiliary tension member to increase the resistance of the lazy tongs to compression, which is desirable in some cases. The spring 60 may be disengaged by removing either of the hooked ends 62 from the holes 64.

A plurality of guides or brackets 66, 68 and 70 are fastened to the supporting plate 2 to hold the welding cable, generally indicated by the numeral 72. As will be observed, the bracket 68 is turned outwardly and the brackets 66 and 70 inwardly. Also, the bracket 68 is offset laterally and outwardly with respect to the brackets 66 and 70, so that the welding cable 72 may be inserted from the inside of the brackets 66 and 70 and the outside of the bracket 68 thereby firmly holding it in place.

The various portions of the apparatus are preferably made of metal, with the exception of the flexible strap 52 which may be of leather. However, it will be understood that the invention is not limited to any particular materials of construction.

Among the advantages of the invention are the provision of a relatively compact device for supporting the arm of a welder which is adjustable to practically every conceivable welding position and which, when not in use, can be adjusted so as not to interfere with the movements of the user. Devices of this type can be constructed of relatively light material and are simple and inexpensive to produce.

Having thus described the inventtion, what I claim as new and desire to secure by Letters Patent of the United States is:

1. A welder's arm supporting device comprising a resiliently expansible arm support, means for supporting said arm support from the body of the user and means for inverting said arm support with respect to said supporting means.

2. A welder's arm supporting device comprising an armrest mounted on one end of a resiliently expansible lazy tongs, supporting means associated with said lazy tongs, means for slidably fastening said lazy tongs to said supporting means whereby said lazy tongs can slide as a unit from one position to another on said supporting means, and means for fixing said lazy tongs against movement as a unit with respect to said supporting means in any predetermined position.

3. A welder's arm supporting device comprising an armrest mounted on the end of a resiliently expansible lazy tongs, a rod-like supporting member, fastening means comprising a plurality of spaced ring-like elements fastened to said lazy tongs adjacent one end thereof and slidably disposed around said rod-like supporting member, a spring coiled around said supporting member between said ring-like elements, and a slidable stop on the outside of each of said ring-like elements for limiting the movement of said spring and for fixing said lazy tongs as a unit in a predetermined position with respect to said rod-like supporting member.

4. In a welder's arm supporting device, an arm support, resilient means comprising a lazy tongs associated with said arm support adapted to contract and expand during use, means for limiting the contraction and expansion of said lazy tongs, and means for supporting said lazy tongs from the body of the user.

5. A welder's arm supporting device comprising an armrest mounted on one end of a resiliently expansible lazy tongs, means associated with said lazy tongs to limit their expansion during use to a predetermined amount, means for supporting said lazy tongs from the body of the user, and means for preventing the expansion of said lazy tongs when not in use.

AUGUST G. GERDES.